United States Patent
Molisch et al.

(10) Patent No.: US 7,593,342 B2
(45) Date of Patent: Sep. 22, 2009

(54) ROUTE SELECTION IN COOPERATIVE RELAY NETWORKS

(75) Inventors: Andreas F. Molisch, Arlington, MA (US); Neelesh B. Mehta, Needham, MA (US); Jonathan S. Yedidia, Cambridge, MA (US); Zhifeng Tao, Allston, MA (US); Zafer Sahinoglu, Watertown, MA (US); Philip V. Orlik, Cambridge, MA (US); Jin Zhang, Cambridge, MA (US)

(73) Assignee: Mitsubishi Electric Research Laboraties, Inc., Cambridge, MA (US)

( * ) Notice: Subject to any disclaimer, the term of this patent is extended or adjusted under 35 U.S.C. 154(b) by 366 days.

(21) Appl. No.: 11/566,846

(22) Filed: Dec. 5, 2006

(65) Prior Publication Data
US 2008/0144512 A1 Jun. 19, 2008

Related U.S. Application Data

(63) Continuation-in-part of application No. 11/377,711, filed on Mar. 16, 2006.

(51) Int. Cl.
*G01R 31/08* (2006.01)
(52) U.S. Cl. .................................................. 370/238
(58) Field of Classification Search ................ 370/216, 370/225, 228, 351, 352–400, 310, 328, 464, 370/480, 492, 229, 235, 238; 455/403, 422.1, 455/427, 428
See application file for complete search history.

(56) References Cited

U.S. PATENT DOCUMENTS

| | | | |
|---|---|---|---|
| 5,412,654 A * | 5/1995 | Perkins | 370/312 |
| 6,314,093 B1 * | 11/2001 | Mann et al. | 370/351 |
| 7,362,803 B2 * | 4/2008 | Huang et al. | 375/232 |
| 2004/0160943 A1 * | 8/2004 | Cain | 370/351 |
| 2006/0114836 A1 * | 6/2006 | Pollin et al. | 370/252 |
| 2007/0019541 A1 * | 1/2007 | Fujii et al. | 370/222 |
| 2007/0160014 A1 * | 7/2007 | Larsson | 370/338 |

OTHER PUBLICATIONS

RICA_IEEE_Proceedings ICDCS02_Dated 2002_Pages 1-8.pdf.*

* cited by examiner

*Primary Examiner*—Kwang B Yao
*Assistant Examiner*—Obaidul Huq
(74) *Attorney, Agent, or Firm*—Dirk Brinkman; Gene Vinokur

(57) ABSTRACT

A method selects a route in a wireless cooperative relay network of nodes, the nodes including a source, a set of relays, and a destination. A codeword is encoded as a data stream. The data stream is transmitted from a source to a destination via a set of relays. Mutual information is accumulated at a particular node to decode the data stream and recover the codeword. Then, a route from the source to the destination is selected based on channel state information between the nodes while transmitting and accumulating.

22 Claims, 7 Drawing Sheets

100

200

ROUTE SELECTION IN COOPERATIVE RELAY NETWORKS

RELATED APPLICATION

This application is a Continuation-in-Part of U.S. patent application Ser. No. 11/377,711, "Cooperative Relay Networks using Rateless Codes" filed by Molisch et al. on Mar. 16, 2006.

FIELD OF THE INVENTION

This invention relates generally to wireless networks, and more particularly to transmitting information in cooperative networks.

BACKGROUND OF THE INVENTION

Ad Hoc Networks

Ad hoc wireless relay networks have a number of advantages over conventional structured networks, such as cellular networks. Ad-hoc wireless networks do not require a fixed infrastructure. This can reduce cost. Because signals can he transmitted via different routes, reliability is increased. Energy consumption can decrease because intermediate relay nodes can receive and retransmit the signals via shorter hops. Because the total transmitted energy is decreased, the lifetime of the network is increased, there is less interference, and spectral efficiency is improved.

As a disadvantage of ad hoc relay networks, a route from a source node to a destination, node needs to be specified. The route specifies a sequence of nodes involved in relaying of the information, a transmission protocol, energy allocations at the nodes, and a transmission schedule.

In conventional ad-hoc relay networks, the source node typically encodes information with an error-correcting code, and the information is transmitted via the sequence of nodes in the route. The encoded information is called a codeword. As used herein, a codeword can be a file or block of data bytes.

Rateless Codes

In situations where the channel state information (CSI) is unknown, a weak block error-correcting code can result in unreliable communication due to noise, while a strong block error-correcting code wastes energy. Rateless codes solve this problem. Instead of encoding the information as a predetermined number of bits using a block error-correcting code, the information is encoded into a potentially infinite stream of bits. Then, the receiver only decodes bits in the flow until the information is recovered.

Rateless codes include fountain codes, punctured low-rate block codes, Reed-Solomon codes, convolutional codes and turbo-codes. Rateless codes were originally designed for erasure channels. However, rateless codes also work well for additive white Gaussian noise (AWGN) channels. Rateless codes have also been used for Ethernet, point-to-point, broadcast and multicast applications.

Routing Protocols

A relay node receives a signal from a previous node. The node can either amplify the signal in an amplify-and-forward protocol, or the node can decode the information in the signal, re-encode the information, and then retransmit the signal in a decode and-forward protocol to the next node. This process continues until the signal is received by the destination node. Such a relaying scheme is known as multi-hop routing. Conventionally, only one node is forwarding the signal to a next node at any one time using a single route with multiple sequential hops from the source node to the destination node.

A number of methods are known for selecting optimal routes in multi-hop ad hoc relay networks. In one method called "flooding," each node broadcasts the information along with the address of the node and the energy (or power) used for the transmission. The destination node can then select the optimal route from the accumulated information it receives. The nodes participating in the route can then be informed of the route using feedback information.

If all channel state information is available at a single location, then, the optimal route can be determined using an optimization technique that minimizes the total energy consumption in the network, or other optimization criteria. Distributed methods for optimal, route determination are also known.

Another issue in ad-hoc networks is flow control. With flow control, the source node transmits a continuous bit stream (flow), and the relay nodes direct the flow concurrently over several, parallel links to the destination node. Relay nodes can receive multiple such flows, and re-distribute the flows to subsequent relays in the network until the flows reach the destination node.

Cooperative Relay Networks

Cooperative relay networks provide an alternative for single route multi-hopping. In a cooperative relay network, multiple nodes can concurrently transmit the information. In a conventional (state-of-the-art) cooperative relay network, multiple nodes transmit the same information, and a receiving node accumulates the energy from all of the signals before decoding the information. This can increase the diversity order at the receiving node. In addition, the information can he transmitted concurrently over several parallel routes for route diversity. Thus, a probability of deep fades is decreased. Furthermore, the accumulation of the energy increases the energy efficiency of the transmission.

Networks that use cooperative communications have a different set of problems such as parallel route selection, and code selection for particular links. Expected energy cost under the assumption of cooperation and network topology are also issues.

Prior art route selection and optimization techniques generally assume that the nodes along the route perform energy accumulation. However, routes selected in that manner are sub-optimal when used in networks where the nodes accumulate mutual-information. Therefore, the prior art routing methods are not applicable for networks according to the invention.

The routing protocols described in the commonly assigned parent application Ser. No. 11/377,711, "Cooperative Relay Networks using Rateless Codes" filed by Molisch et al. on Mar. 16, 2006, assume that any node that has sufficient mutual information participates in the transmission. In a quasi-synchronous protocol, a specific scheduling scheme is assumed, and only two hops are allowed between source and destination. Obviously, a two hop network is relatively restrictive.

An asynchronous scheme makes special assumptions about the starting time of a node transmission and the duration, and allocates transmit power equally.

it is desired to proved route selection in a more general manner for networks that are unconstrained in size.

SUMMARY OF THE INVENTION

The embodiments of the invention provide a method for communicating information in a wireless cooperative relay network where a receiving node can accumulate mutual information from more than one transmitting node. More particularly, multiple relay nodes transmit differently encoded versions of the information. The receiver is capable of combining the mutual information in the different version during the decoding. The invention provides a method for selecting route, transmit power, and transmit times in a network with such nodes.

The embodiments of the invention can optimize performance in terms of transmission time, network lifetime, energy consumption, throughput, signal-to-interference ratio, or other suitable criteria, or a combination thereof. The embodiments achieve this optimization by dynamically adjusting routing, transmission power, scheduling, transmission time, and used codes, according to the network topology and the state of the transmission channels between the nodes.

The optimization can use a brute-force numerical search of the optimal combining route, a centralized suboptimal iterative search, or a decentralized suboptimal iterative search.

DETAILED DESCRIPTION OF THE PREFERRED EMBODIMENT

Figure 1:
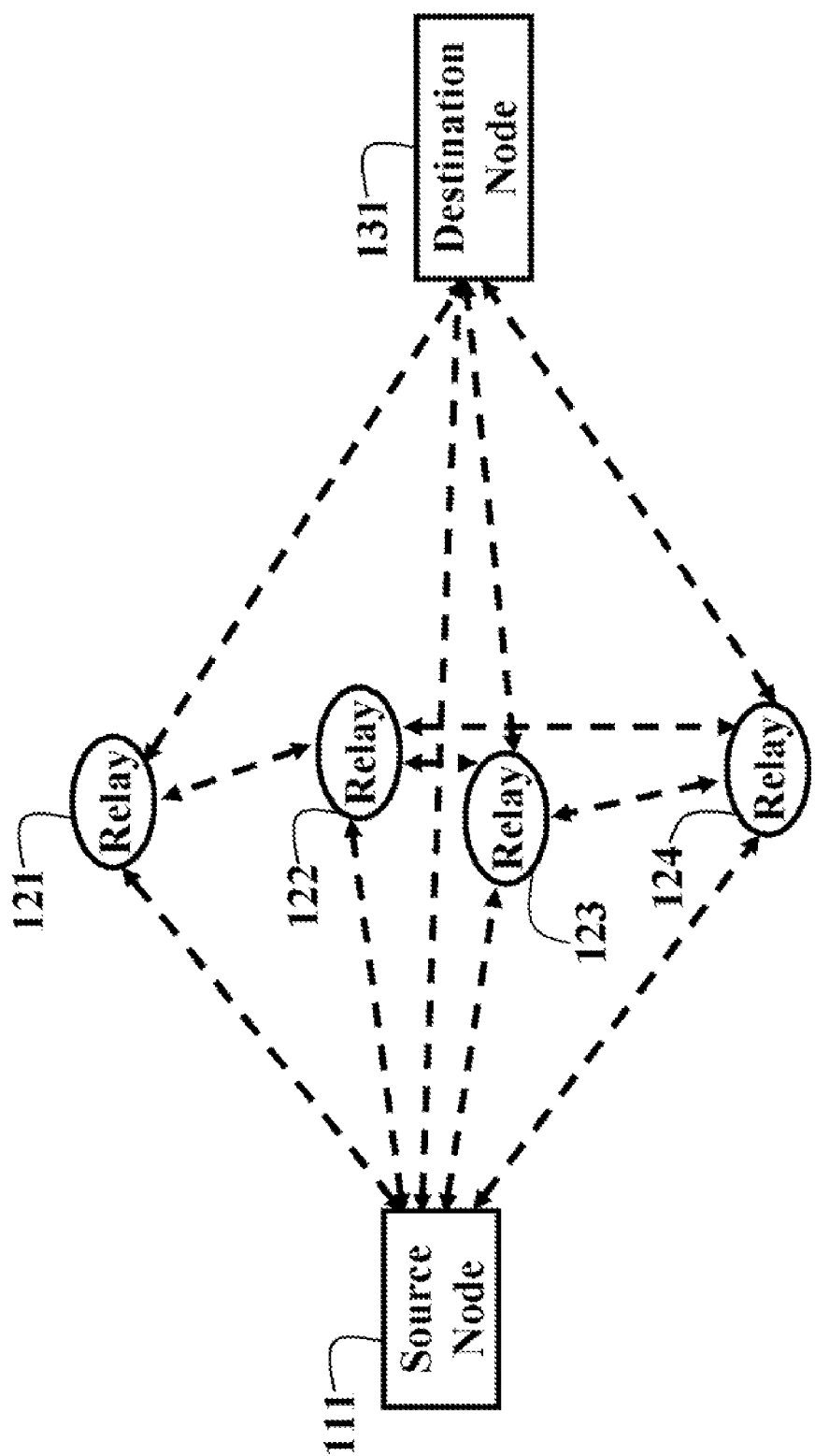
FIGS. 1 and 2 are diagrams of cooperative relay networks according embodiments of the invention.
Figure 2:
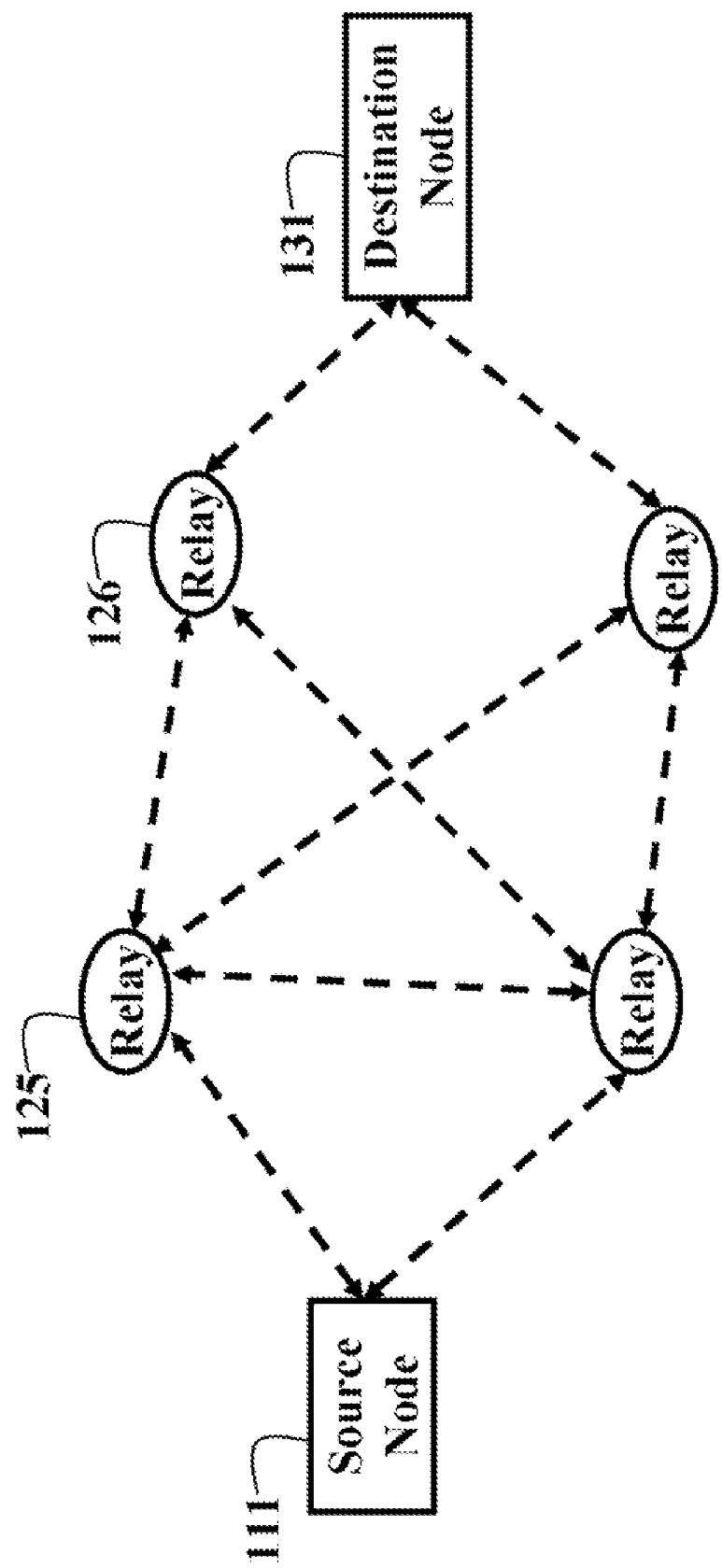

FIGS. 1 and 2 show cooperative relay networks 100 and 200 according to embodiments of our invention. The cooperative relay network 100 includes a source node 111, a set of N relay nodes 121-124, and a destination node 131, i.e., source, relays, and destination, respectively. It should also be understood, that the embodiments of the invention can also by used with multiple relay 'hops' as shown in FIG. 2. In this case, relay 125 also acts as a 'source' for an 'intermediate' relay 126. This scheme can be extended to additional hops.

It is desired to optimize the performance of the network in terms of transmission time, network lifetime, energy consumption, throughput, signal-to-interference ratio, or other suitable criteria, or a combination thereof, possibly subject to constraints such as outage, where outage is defined as not having a successful transmission within a predetermined time or within a predetermined energy.

The source node transmits a codeword to the destination node via a set of N relay nodes. The nodes can form a single route or multiple parallel routes. The codeword can be, for example, a file of data bytes (information). The relay nodes use a decode-and-forward technique. The codeword has bandwidth-normalized entropy of size $H_{target}$, given in scaled nats/Hz, where a nat is information in natural units, i.e., Euler's constant, 2.718 . . . .

The source, as well as the relays, uses rateless codes for encoding the codeword. All nodes operate in half-duplex mode, i.e., a node can either transmit or receive, but not both simultaneously. However, it should be noted that other (block) error correcting codes can also be used for the encoding. For generalized block codes, the accumulated information includes the redundancy built into the codes.

In the following, we allow transmission with a direct-sequence spectrum spreading technique. Such an approach is useful for relay networks, as spreading allows different data streams to be transmitted in a flexible and decentralized way, and the data streams can be distinguished at the receiver. The transmit power of a node $n_i$ is $P_i$. The propagation channels between the nodes are modeled as frequency-flat, block fading channels. The channel gains are independent and exponential-distributed, corresponding to Rayleigh fading of the amplitudes. Again, note that these assumptions are made only to provide an example, and that different multiple access schemes, as well as different transmit powers for the different nodes, possibly varying with the remaining battery lifetime, the average channel state, or the instantaneous channel state, can be used in conjunction with our methods.

Our receivers are mutual information accumulating receivers. These receivers can distinguish the various information streams from different relays that might arrive concurrently. For example, the receivers can use multi-user detection to distinguish the different rateless codes. In a CDMA system, a receiver can process the received data streams from the different relay nodes when the data streams arrive with relative delays that are larger than the chip duration.

The receivers include rateless code decoders, so that data streams from different relay nodes can be distinguished, and the mutual information of signals transmitted by relay nodes can be accumulated. Again it is emphasized that conventional block error correcting codes can also be used.

In one embodiment of the invention for a CDMA system, the different nodes use different spreading codes in order for the destination to separate the different data streams and to extract the information contained in the data streams. However, different spreading codes are not always necessary. For example, when all relays use the same code, i.e., rateless or block code, and send their signals to the destination synchronously, the same spreading codes can be used.

Quasi-Synchronous Transmission

Figure 3:
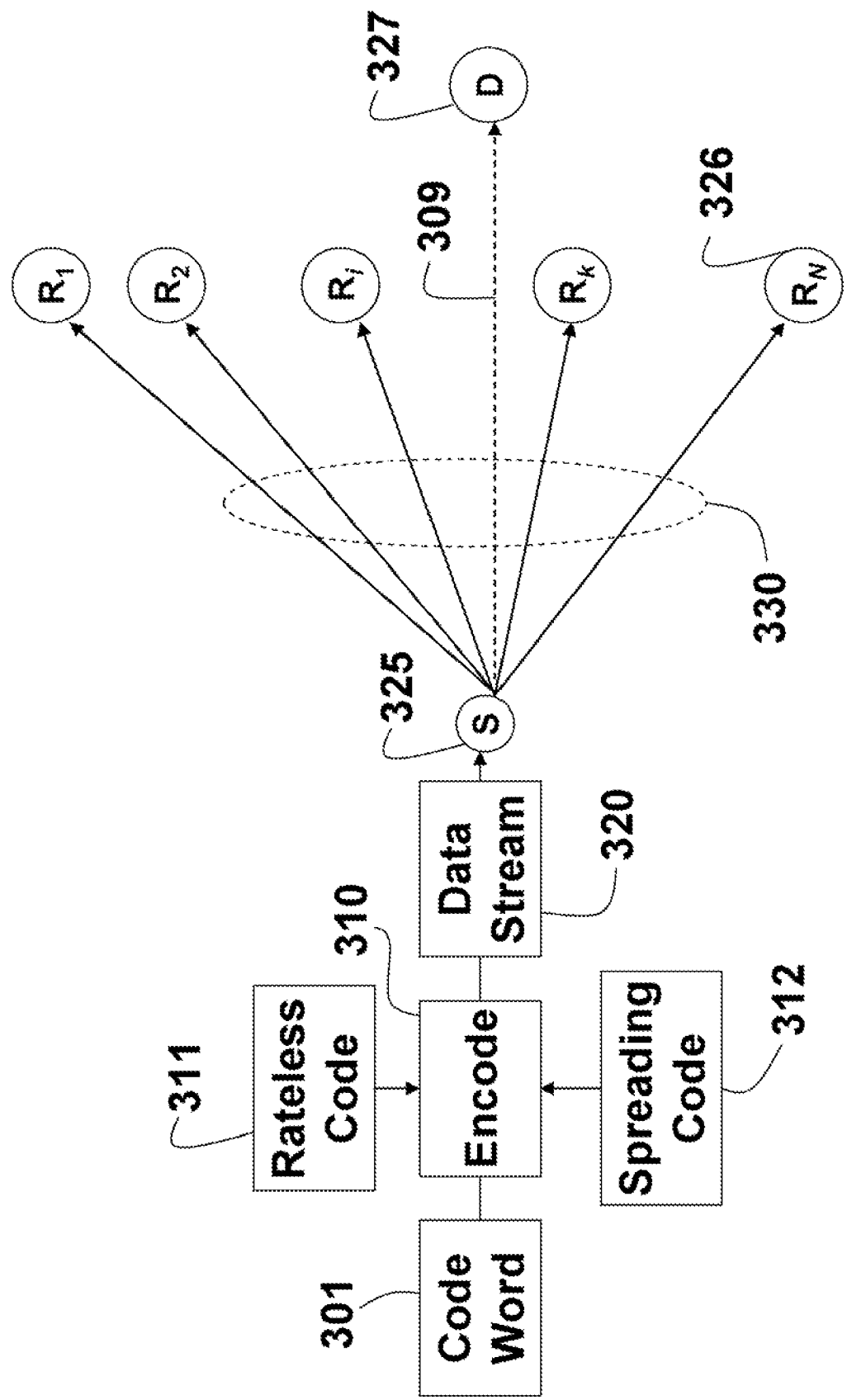
FIG. 3 shows a broadcast step of a protocol according to an embodiment of the invention.

As shown in FIG. 3, a codeword 301 is encoded 310 using a rateless code 311 and, optionally, a spreading code 312 to produce a data stream 320. The codeword 301 can be any arbitrary collection of bits or 'information.' A source (S) 325 broadcasts 330 the data stream to be received by the destination (D) 327 to a set of relay nodes (R) 326. The broadcast of the data stream can be in the form of packets.

Figure 4:
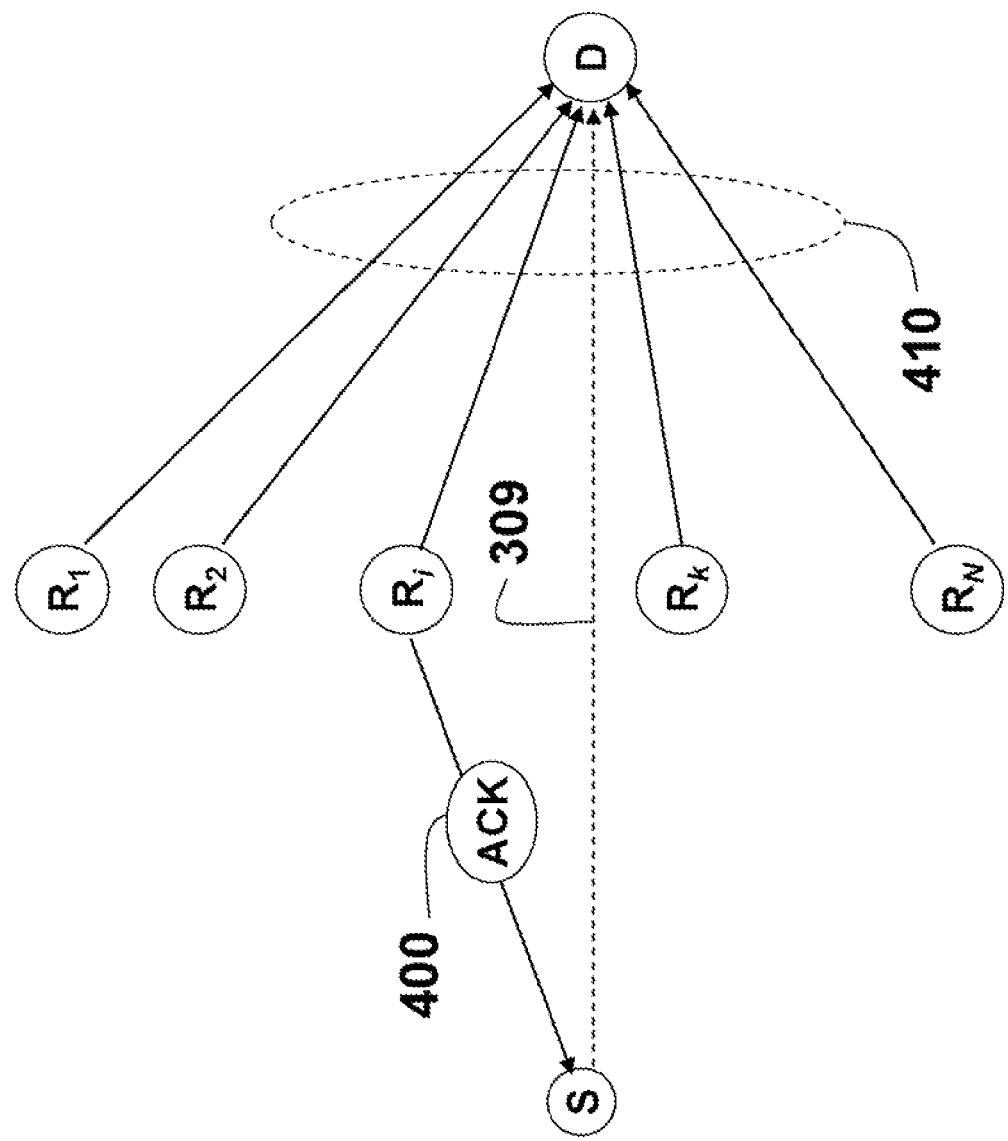
FIG. 4 shows an acknowledgement step of a protocol according to an embodiment of the invention.

As shown in FIG. 4, as soon as a relay node has accumulated, sufficient mutual information to decode the data stream to recover the codeword, the relay transmits an acknowledgement (ACK) 400 back to the source that the reception was successful.

After the source receives a predetermined number of acknowledgements 400, the source terminates the broadcasting, possibly after informing the relay nodes about the termination of the broadcasting from the source.

Concurrently, the relay node reencodes the recovered codeword to the data stream, and switch from reception to transmission.

For this second phase, we can consider two cases. First, all the relay nodes transmit the data stream 410 encoded with the same rateless code. The rateless code can be the same as that used by the source. Due to the delay difference inherent in the transmission from randomly located relay nodes, the data streams arrive at the destination with slightly different delays. In the following, we assume that those delays are larger than a chip duration, but much smaller than the symbol duration. This assumption can be achieved in direct-sequence CDMA systems with large spreading factors. The destination is capable of accumulating the mutual information of the data streams received from the relay nodes.

Second, each relay node uses a different rateless code and a different spreading code for the transmission of the data streams 410. In this case, the destination can distinguish the signals from the different relay nodes through their different spreading codes, and accumulates the mutual information. It should he noted that the destination can also use the data stream 309 broadcast by the source.

Figure 5:
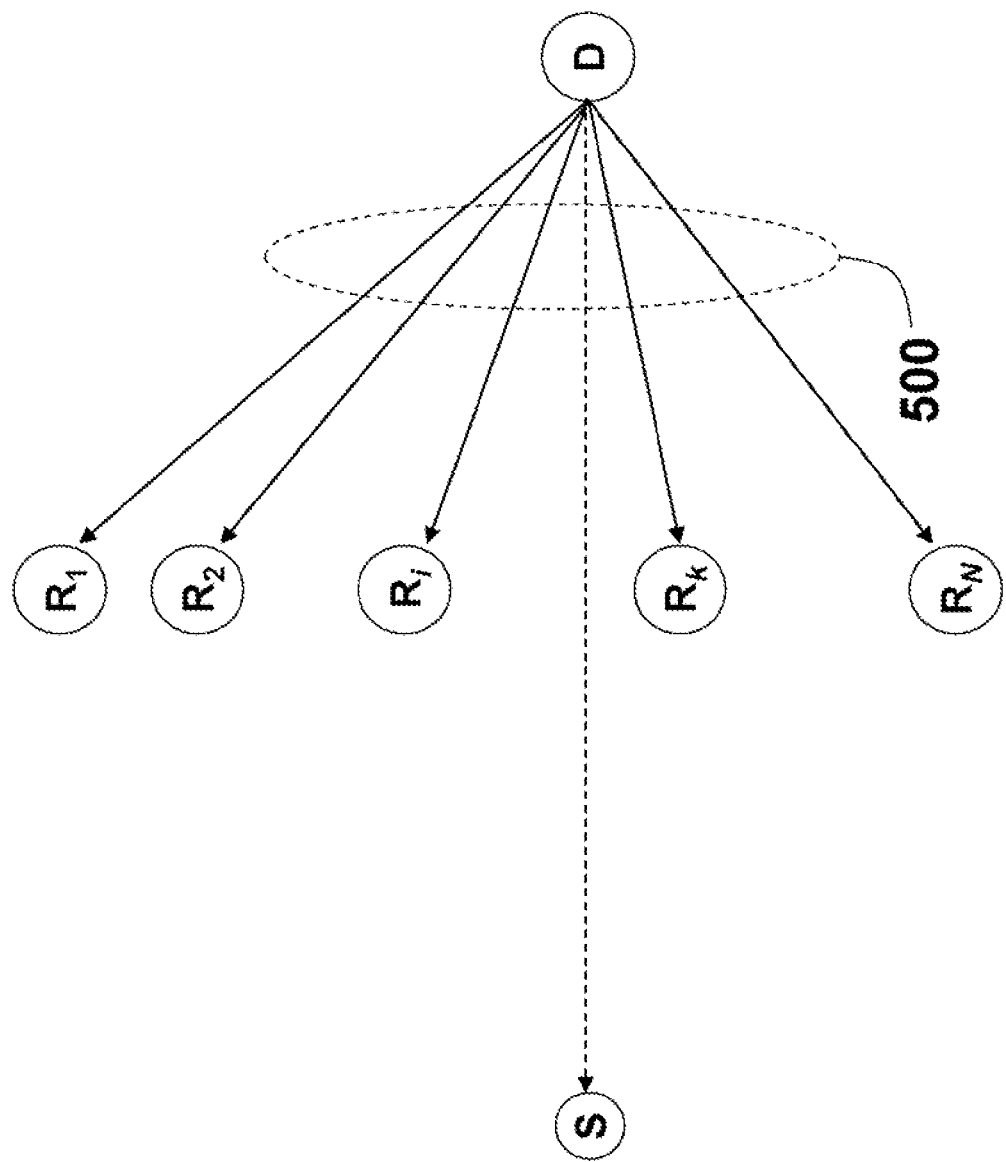
FIG. 5 shows a termination step of a protocol according to an embodiment of the invention.

In either case, as shown in FIG. 5, the destination broadcasts a signal 500 to the relay nodes, and possibly even to the source, to terminate transmission as soon as the destination has successfully decoded the data streams transmitted by the relays, and possibly the source, to recover the codeword 301.

Intuitively, the difference between the use of single and multiple rateless codes can most easily be understood for the simple example of binary signaling using two relays on an erasure channel with erasure probability $p_e$. If the relays use the same rateless code, then each bit will be erased with probability $p_e^2$, so $1-p_e^2$ bits are effectively received per relay transmission.

On the other hand, if two different rateless codes are used, the transmissions are independent, and $2(1-p_e)$ bits per relay transmission are received. Note that the complexity of the receivers required for the two protocols does not differ significantly. If the sampling rate of an analog-to-digital converter (ADC) in the receiver is identical to the symbol rate, then both receivers require L correlators. In the first case, all correlators form the correlation with the same spreading sequence, and add up the results according to maximum-ratio combining.

Alternatively, a receiver can use only a single correlator, whose output is sampled L times during each symbol duration. This saves some hardware complexity. However, the signals can arrive from the different relay nodes at irregular intervals, and thus necessitate an ability of the ADC to sample at the chip rate. This fast sampling of the ADC increases power (and thus energy) consumption significantly, and thus might not be desirable for battery powered sensor-network applications.

In the second case, each correlator is used for the detection of the signal from a different relay node. The main difference lies in the decoder, which is more complex if multiple rateless codes are used. The spectral efficiency of the second method is worse, because it uses up multiple spreading codes for the transmission of one codeword, though the improved coding gain partly offsets this effect.

Note also that a combination of the first case and the second case can also be used.

Asynchronous Transmission

With the quasi-synchronous transmission as described above, the relay nodes only receive the data streams broadcast by the source node. However, when we use rateless codes, the relay nodes can also 'help' the other relays to decode the data streams faster, and thus accelerate the transmission process, and thus reducing energy consumption. The idea is that a relay node starts to transmit the reencoded data stream to the destination as soon as the relay has received sufficient information to decode the codeword. This transmission can also be received by other relay nodes that are still in the receive mode. Thus, the relay nodes that are in transmit mode help the relay nodes that are still receiving to decode the data stream faster. That is, the other relays decode both the broadcast data stream and reencoded data streams.

As shown in FIG. 3, the source node starts by broadcasting the data stream to all of the relay nodes using the assigned spreading code and rateless code.

All relay nodes accumulate continually the mutual information. The source signals when the transmission with a given spreading code starts to avoid unnecessary reception of noise by the receivers. The source stops transmission as described for FIG. 4.

Figure 6:
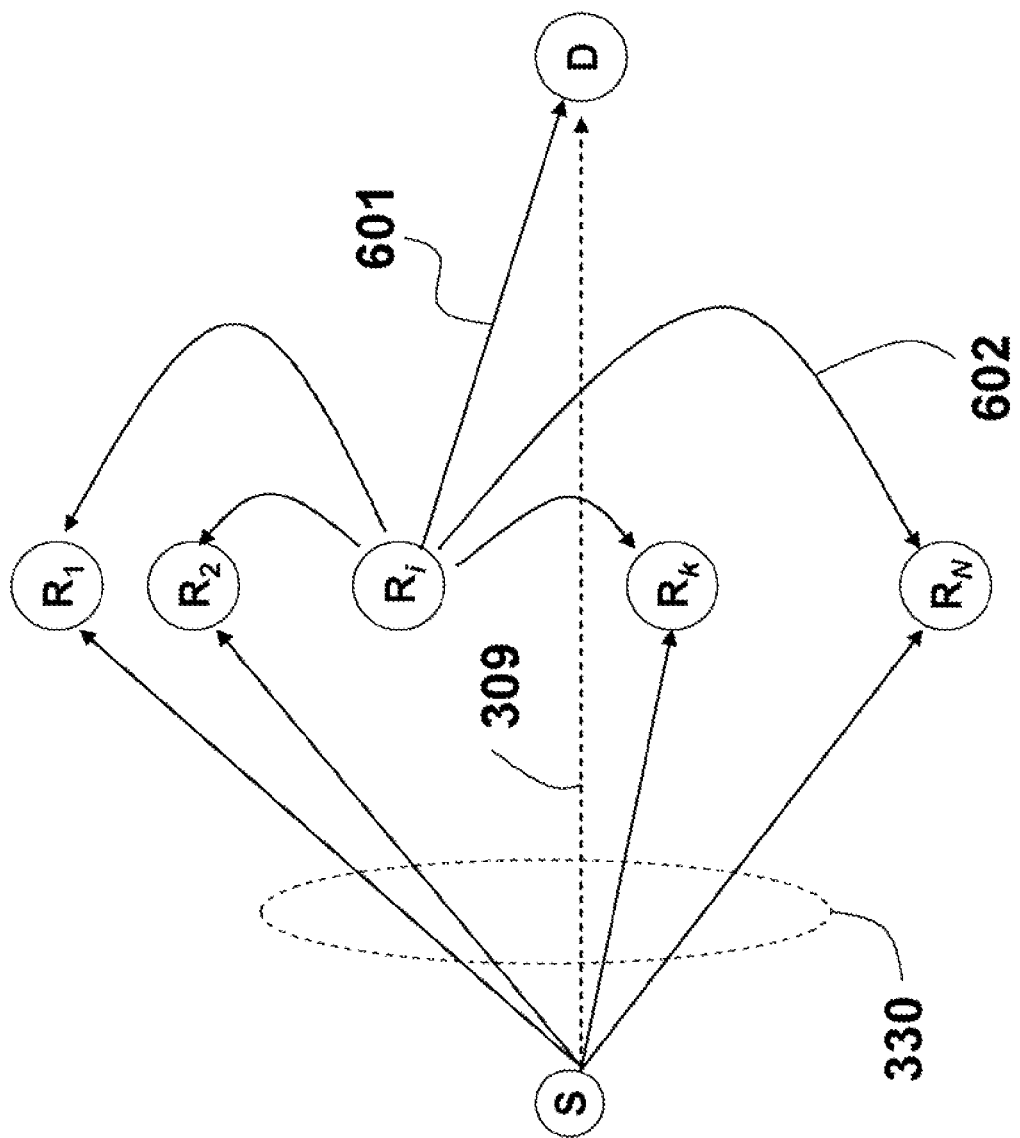
FIG. 6 shows a transmit step of a synchronous protocol according to an embodiment of the invention.

As shown in FIG. 6, as soon as a relay node has sufficient information to decode the codeword, it switches from receive mode to transmit mode. The relay retransmits the codeword as the data stream 601 using its assigned spreading and rateless code. Because the relay nodes that are in reception mode observe all spreading codes simultaneously, they can receive the data stream 330 from the source node and the data streams 602 from the relay nodes that are transmitting to the destination, and accumulate the mutual information from all those nodes, to decode the data streams faster.

The destination node continuously receives all the data streams for the different relays, and thus accumulating the information from the various relay nodes. As described above, the destination can also use the contribution 309 received directly from the source.

The destination broadcasts, as shown in FIG. 5, the signal 500 to the relay nodes, and perhaps also to the source, to terminate transmission as soon as it has successfully decoded the source data stream to recover the codeword.

We assume that transmissions continue until the destination has successfully recovered the codeword. Some energy can be saved if the source monitors the relay nodes, and stops transmitting as soon as all relay nodes are in transmit mode.

Route Detection

The above protocols work implicitly by determining which nodes participate in the transmission, the powers and transmission times of the nodes. However, it can be advantageous to explicitly optimize those parameters—a process which is equivalent to finding the optimum route (including the parameters of the nodes on the route). In the following we describe how to find this optimum route, in a network that has no restrictions on its size or number of hops.

Assumptions

Optimization of routes in cooperative networks is particularly difficult, because there are more free parameters that need to be optimized. Therefore, we make some simplifying assumptions, while recognizing that a certain amount of overhead transmission is inevitable in the network:

(i) The nodes in the network are geographically distributed randomly. It is possible, but not necessary, that the locations of some or all nodes are known, e.g., through GPS or ultra-wideband positioning. Such side information can be used by the routing process, as it helps to provide information of the direction towards which the information should be forwarded. In the following, we do not take such side information into account; however, the use of such side information for routing in information-accumulating cooperative networks is part of the patent.

(ii) For simplification, route selection is centralized. However, distributed routing can also be used, especially in large networks.

(iii) The instantaneous or average CSI is also known centrally. The amount of channel state information can vary. Typically, we consider situations where either the instantaneous CSI or the average CSI is known. The CSI can be noisy, due to noise and interference during the observation, and/or quantization when the CSI is transmitted through the network, and/or changes in the channel due to the delay between the measurement of the CSI and its use in the routing process. In the following descriptions, we only consider perfect instantaneous CSI or perfect average CSI; however, other forms of CSI are included as part of this description. The cost of acquiring and distributing the CSI can be factored into the total energy cost.

(iv) We assume that each node accumulates perfectly mutual information from different transmitters. An approximation to this assumption can be realized when rateless codes are used, and different rateless codes use different time-frequency spreading codes, so that the receiver can distinguish the codes. We also assume that rateless codes for finite-size source words do not have ideal properties, e.g., the overhead can be greater than the Shannon limit. In the following, we ignore the non-idealities of the rateless codes. It is also possible that one node uses multiple spreading codes and/or fountain codes to circumvent limitations on the transport block size.

(v) Unless explicitly stated otherwise, we assume that all spreading codes in the network are perfectly orthogonal, so that the transmission of a bit stream or flow using one rateless code does not interfere with the transmission of bitstreams encoded with other rateless codes.

(vi) We also assume that each node can receive a signal of arbitrarily low signal-to-noise ratio, and that no overhead is required for synchronization and channel estimation at the receiver. This is an idealized assumption in the presence of a certain synchronization and channel estimation overhead.

(vii) Feedback of information 400 that a node has successfully decoded the information is assumed to be instantaneous, and does not require any overhead. However, the techniques described herein are also applicable when finite overhead and delayed transmission of this feedback information is used.

(viii) The transmission can be unicast where a single node transmits information to single receiving node. The transmission can also be generalized to include multiple and possibly correlated nodes (multiple flows) and/or multiple destination nodes (multicast).

(ix) We assume that the channel does not show delay dispersion, and can be characterized by a single scalar, complex attenuation coefficient at any point in time. However, we do allow for the possibility of fading (time variation) of this attenuation. Should delay dispersion be present, spreading codes are used to diminish its effect.

(x) We assume that the source node starts transmitting a new codeword only after the previous codeword has been successfully decoded by the destination node. In this way, only one message from the source node is in the network at any one time.

Optimization Model

Conventional ad-hoc routing uses the following free parameters: the nodes that cooperate, the transmit power at each node, and the order in which the nodes transmit.

Cooperative relay networks also determine the following parameters for each node i in the network: the rateless code $C_i(t)$, the spreading code, the starting time $t_i$ of the transmission, and the duration of the transmission $\tau$.

The goal is to optimize any combination of the following criteria: the total energy consumption of the network, the total transmission time from the source to the destination node, the spectral efficiency of the transmission, and the lifetime of the network.

As one useful measure for the spectral efficiency, we define a "blocking area" around a transmitting node (though other measures for the spectral efficiency can be used in our method as well). In the blocking area, the radiation from the node is so strong that no other communications can be received. Strictly speaking, a size of the blocking area depends on a detection threshold of the receiver and on the propagation condition in the environment. The "blocking time" is when the node is transmitting. A product of blocking area and blocking time can be a measure for the spectral efficiency. The total number of spreading codes needed to transmit the codeword is a further parameter characterizing the spectral efficiency.

It is assumed that nodes have a finite amount of available energy, i.e., the nodes are battery operated. The lifetime of the network "expires" when the first node has used all its available energy and stops operating. Other definitions of network lifetime, such as "the time after which no possible route exists from the source to the destination," or "the time it takes for the network to partition," Network partitioning is a wide scale topology change that separates the network into completely disconnected portions. This can cause sudden and severe disruptions to ongoing network routing and upper layer applications.

The optimization criteria can be in the form of linear or nonlinear functions, or hard constraints. For example, a penalty function that uses a weighted sum of the transmission time and transmission energy of a codeword, or a hard constraint on the transmission time $\tau$.

Accumulated Mutual Information

With the above assumptions, the accumulated mutual information can be stated as follows. A source node $n_0$ transmits a codeword to a destination node $n_{N+1}$ via N relay nodes $n_i$. Each node starts transmission at time $t_i$ for a duration $\tau_i$ with a power $P_i$, and a spreading code $C_i$ that has a spreading gain SF. An indicator function $I_i(t)$ is 1 if $t_i < t < t_i + \tau_i$ and zero otherwise. The power of a received signal must be greater than a minimum threshold power $\epsilon$. Furthermore, a transfer function $h_{ij}$ is the complex amplitude baseband channel gain from node i to node j. Furthermore, the codeword has a entropy $H_{target}$ normalized to unit bandwidth. Then, the mutual information accumulated at node i at time t is $$H_i(t) = \sum_i \int I_j(t) \log_2 \left[ 1 + \frac{P_j h_{ij}}{N_0 + \sum_{k=i,j} I_k(t) P_k h_{ki} / SF} \right] dt,$$

where $N_0$ is the power of noise. This formulation assumes implicitly that the residual interference acts like noise, and is not suppressed by any interference suppression mechanism, such as joint detection in the receiver.

If interference suppression is used, then the denominator in the above Equation is replaced by the interference-plus-noise power at the output of the joint-detection receiver. In order to reduce the complexity of the problem, we also assume that the transmit power of a node is constant. We also define $t_{min,0} = 0$, and $t_{min,j}$ for $0 < i \leq N+1$ implicitly by $H_i(t_{min,j}) = H_{target}$.

We impose the constraint that $t_i \geq t_{min,j}$. In other words, any node can only start to transmit after the node has decoded the codeword. Furthermore, it makes sense to constrain the transmit time such that $t_i + \tau_i \leq t_{min,N+1}$, so that no nodes transmit after the codeword has been decoded.

If we want to take practical requirements for signal acquisition into account, then we have the constraint $P_i \geq \epsilon_i$. Each node also has a maximum power constraint due to hardware restrictions $P_i \leq P_{max}$. The total energy expended by a node $n_i$ is $E_i = \int I_i(t) P_i dt$, and the total energy in the network is $$E_{total} = \sum_{i=0}^{N+1} E_i.$$

Note that we could also include in $E_i$ is the energy required for reception, as well as the energy required for obtaining channel state information and forwarding it to the appropriate recipients, like a central node.

The blocking area for a given spreading code $C_m$ is denoted by $A_m(t)$, from which we can derive a measure of the spectral efficiency S.

We minimize a penalty function $D(E_0, \ldots, E_{N+1}, t_{min, N+1}, S)$, where the function D can be a linear or nonlinear function of the parameters, and/or have hard constraints. For example, a quality-of-service constraint can be $\Pr(t_{min,N+1} > t_{admissible})$ <outage, where, $t_{admissible}$ is the admissible time for a message to travel from the source node to destination node, and outage is the admissible outage probability.

General Optimization Procedure

The above description provides a theoretical formulation of the optimization problem. A solution for the unknown parameters can be obtained by any conventional standard optimization methods, such as simulated annealing, genetic algorithms, Monte-Carlo simulations, and the like. The optimization can be performed at a central location or in a distributed manner.

Figure 7:
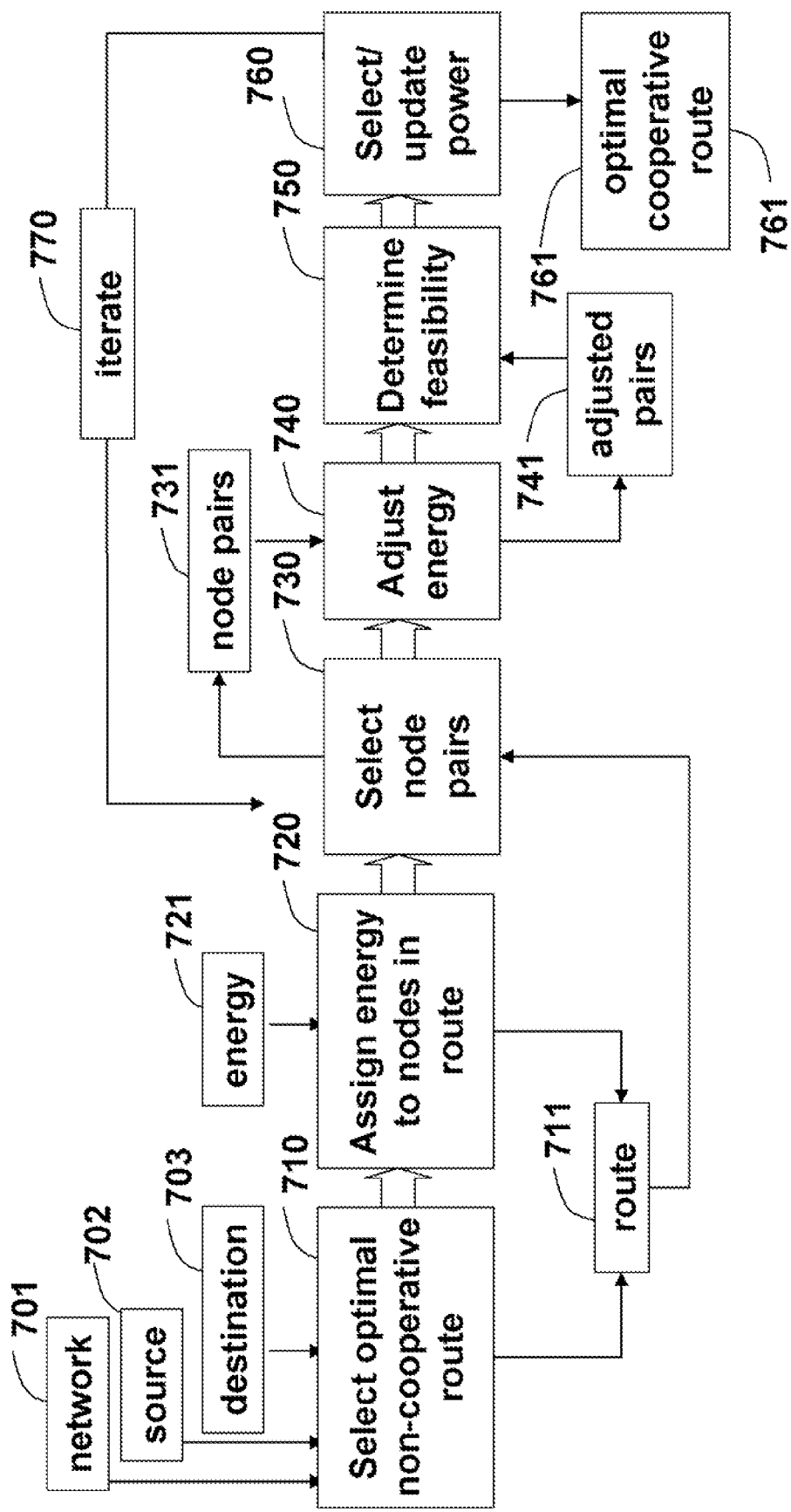
FIG. 7 shows a block diagram of the transmission time optimization according to an embodiment of the invention.

FIG. 7 shows an example optimization where we minimize the transmission time for a codeword, subject to constraints of the total energy that is expended on the transmission.

Given a network of nodes 701, a source node 702 and a destination node 703, the optimization process starts by selecting 710 an optimal non-cooperative route 711, where each node decodes the codeword as soon as the node accumulates enough mutual information. The optimal non-cooperative route can be selected according to conventional techniques.

To simplify the search for the optimal route, we initially assign 720 1/N of the total admissible energy to each node. This automatically fulfills the constraint on the total energy.

Beginning with the optimal non-cooperative route with assigned energy, we can use simulated annealing to find nodes and power settings that decrease the total transmission time. We adjust the power settings and transmission times such that the codeword can still be decoded by the next node alone the route.

The simulated annealing process can operate as follows. We randomly select 730 pairs of nodes 731. We adjust 740 the energy of the selected pairs as follows. We increase the energy assigned to one of the nodes by a small amount Δ, and decreasing the energy of the other node by the same amount.

For the pair of nodes 741 with the adjusted energies, we determine 750 the feasibility of the power and transmission time settings, i.e., the settings that fulfill the constraints described above. Then, we select and update 760 the power setting. The setting can be selected randomly, or alternatively, we can select the feasible setting that results in the smallest total transmission time for the codeword from the source node to the destination node. If the resulting transmission time is smaller than the transmission time for a previous power allocation, we update the power settings appropriately. If this results in a longer transmission time, then we update with some probability p that decreases with the transmission time penalty and update the power even if that leads to decreased performance to avoid any local minimum during the optimization.

The optimization process iterates 770 until convergence, or until a certain maximum number of iteration steps has been performed.

Specific Optimization Procedures

We describe a number of special cases. These serve as examples of the embodiments of the invention, but should not be construed as limiting the general applicability of the invention.

Flooding

During a flooding technique, each node starts transmitting information at a time $t=t_{min,j}$ with a maximum allowable power $P_{max}$ as soon as the node has decoded the codeword. The node continues transmission until the destination node has decoded the codeword. This minimizes the total transmission time. It is noteworthy that any transmission by a relay node leads to a reduction in the total transmission time under the assumption of perfect suppression of interference from this transmission at other nodes, even if the distance from the relay to the destination is larger than the distance from the source to the destination. Intuitively, the transmission by such a relay node helps to speed up the transmission by nodes closer to the destination, and thus, allows the receiver of the transmissions to start transmitting earlier, which decreases the total transmission time. However, this wastes energy, as well as spectral resources.

One way to improve the spectral efficiency is to reuse the spreading codes for nodes that are sufficiently isolation from each other. Consider two nodes i and j, and determine whether a transfer function $h_{ik}$ from node k to node i exceeds a predetermined threshold, i.e., node i contributes "significantly" to the mutual information received by node k. If, for all nodes k, the transfer function $h_{jk}$ from node j to node k is smaller than a factor Z, the required signal-to-interference ratio, then the nodes i and j can use the same spreading code.

Decremental Node Subtraction

In this approach, we initially use flooding of the network for the selection of the route and the assignment of power. Then, for each node, we determine the decrease in power consumption and the increase in the transmission time if the node would be subtracted from the network. If the increase in the transmission time is less than a threshold, then the node is subtracted. Similarly, we can subtract nodes that increase interference due to their blocking area and time, if the increase in the total transmission time due to the subtraction is small.

Incremental Node Addition

In this approach, we start out with the nodes in the best non-cooperative route as described above. For each possible node in the network, we determine separately a decrease in the total transmission time for a given energy consumption and a given transmission time if the node is also included in the route in a cooperative manner. The node with the maximum decrease is added to the route. The procedure is repeated until either the addition of a further node yields only a small improvement in performance, or the number of participating nodes reaches a predefined threshold.

Decentralized Termination

In a decentralized approach, each node starts transmission after the node has decoded the codeword. Transmission is stopped after k nodes "closer" to the destination node have decoded the codeword.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for selecting a route in a wireless cooperative relay network of nodes, the nodes including a source, a set of relays, and a destination, comprising the steps of:
   encoding a codeword as a data stream;
   transmitting the data stream from a source to a destination via a set of relays;
   accumulating mutual information at a particular node to decode the data stream and recover the codeword; and
   selecting a route from the source to the destination based on channel state information between the nodes while transmitting and accumulating, wherein the selecting uses an optimization process and optimization criterion, and wherein the optimization process minimizing a penalty function, and wherein the optimization process iteratively subtracts nodes from a suboptimum route that lead to a largest improvement of the penalty function, and wherein the optimization method is to iteratively subtract the nodes from a predetermined route that do not substantially increase an amount of the accumulated mutual information.

2. The method of claim 1, in which the code is a block error correcting code.

3. The method of claim 1, in which the code is a rateless code.

4. The method of claim 1, further comprising:
   encoding the codeword using a spreading code.

5. The method of claim 1, in which the codeword is an arbitrary accumulation of bits.

6. The method of claim 1, in which the data stream is broadcast as packets.

7. The method of claim 1, in which the route identifies nodes in the route, and specifies power, transmission times, and spreading codes used by each identified node.

8. The method of claim 7, in which the specifying is based on the channel state information between the nodes.

9. The method of claim 1, in which the channel state information is known at a central location, and the route is selected at the central location.

10. The method of claim 1, in which the route identifies nodes in the route, and further comprising:
    broadcasting the route to all nodes in the network.

11. The method of claim 1, in which the channel state information is known at a subset of all of the nodes and the channel state information is determined in a distributed manner.

12. The method of claim 1, in which the optimization criterion minimizes a probability that a transmission time of the data stream exceeds a predetermined threshold.

13. The method of claim 1, in which the optimization criterion minimizes an energy consumption in the network.

14. The method of claim 1, in which the optimization criterion minimizes a maximum energy consumption at all of the nodes.

15. The method of claim 1, in which the optimization criterion maximizes a data throughput in the network.

16. The method of claim 1, in which the optimization criterion maximizes a lifetime of the network.

17. The method of claim 1, in which the optimization criterion is a linear combination of transmission time, energy consumption, throughput and lifetime of the network.

18. The method of claim 1, in which the optimization criterion is a non-linear combination of transmission time, energy consumption, throughput and lifetime of the network.

19. The method of claim 1, in which the optimization process is approximate and uses numerical optimization methods.

20. The method of claim 1, in which the optimization process uses simulated annealing.

21. The method of claim 1, in which the optimization process is a genetic algorithm.

22. The method of claim 1, in which the optimization process iteratively adds nodes to select a suboptimum route that lead to a largest improvement of the penalty function.

* * * * *